Patented July 16, 1946

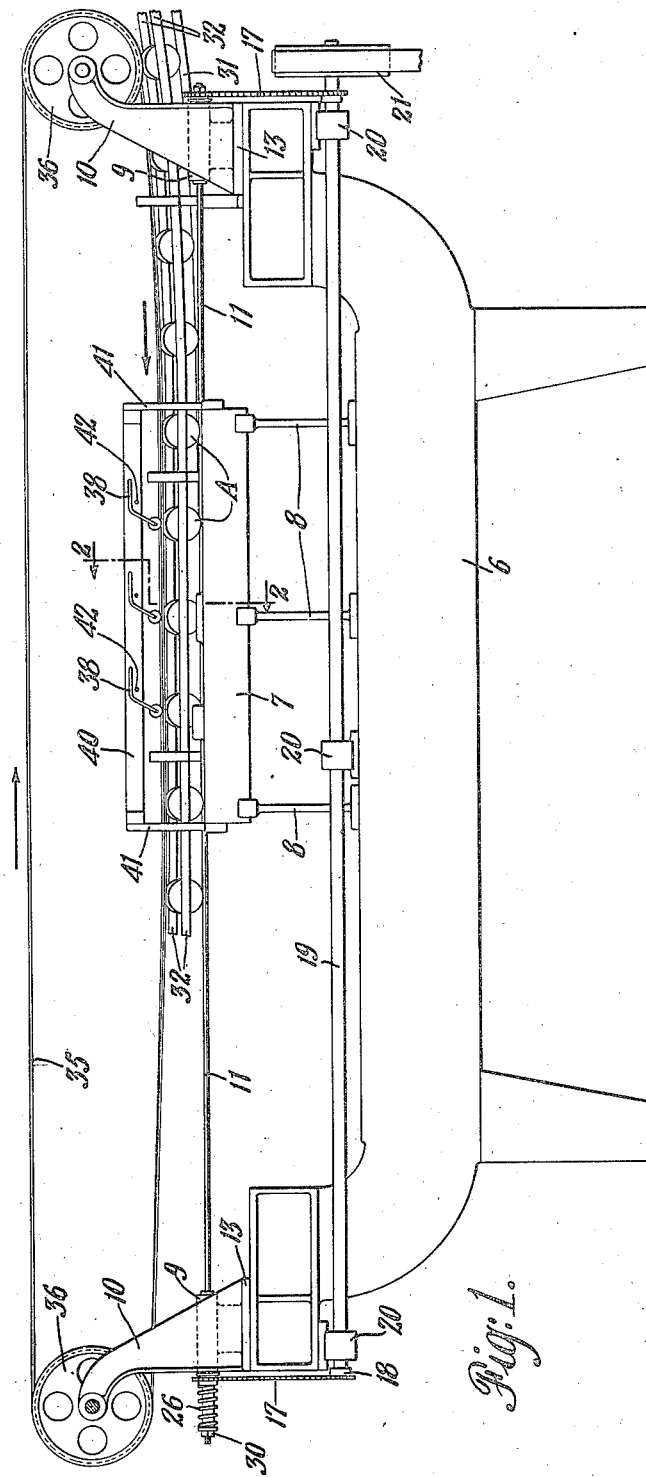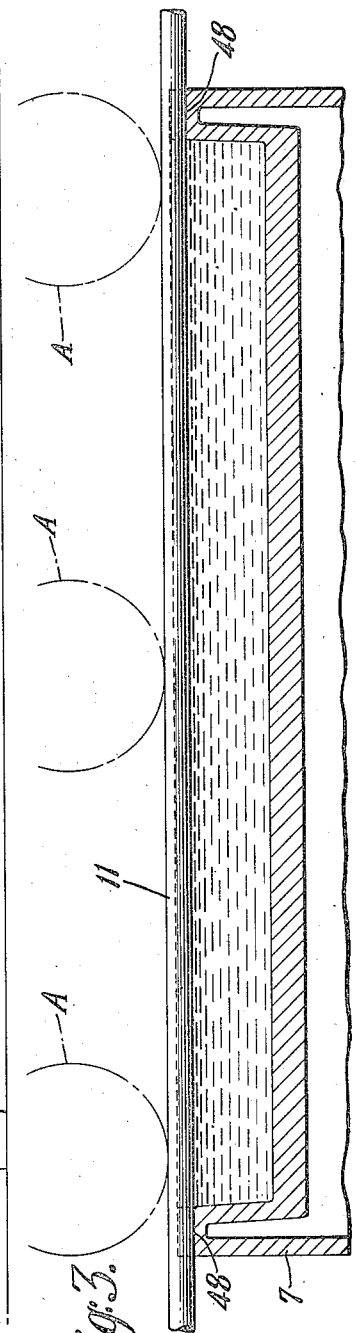

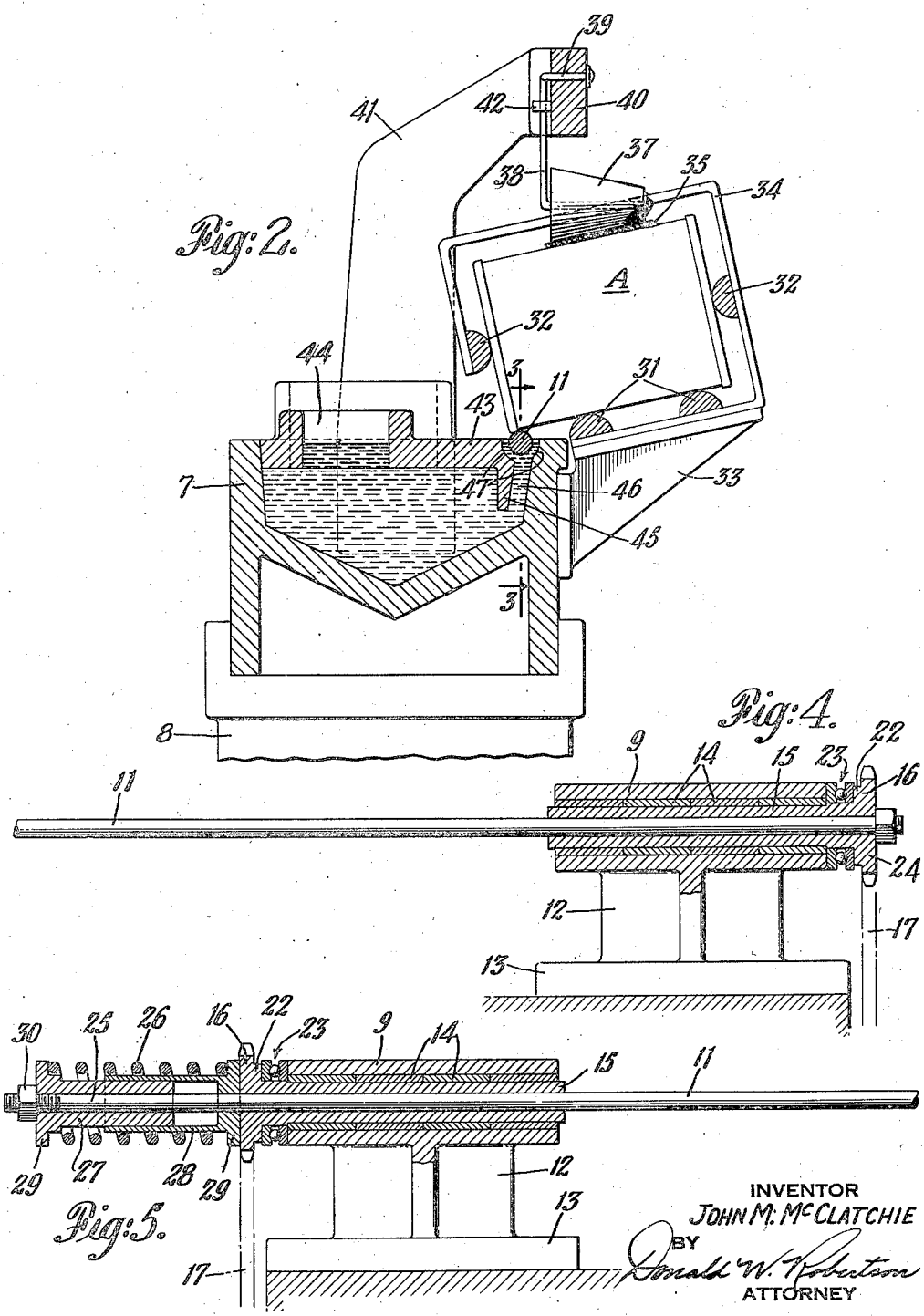

2,403,943

UNITED STATES PATENT OFFICE 2,403,943

SOLDERING MACHINE

John M. McClatchie, Middletown, N. Y., assignor to The Borden Company, New York, N. Y., a corporation of New Jersey Application September 1, 1943, Serial No. 500,783

6 Claims. (Cl. 113—68)

The invention relates to soldering machines, and more particularly to improvements in apparatus for soldering the ends of cans and the like.

In the soldering of the seams of can ends, the conservation of solder is a major consideration from the standpoint of reduction in operating costs. One method commonly employed today for soldering ends on cans consists of rolling the cans in a tilted position through a bath of molten solder, the corner of the can being submerged in the solder as it passes through. This method has the objection that a considerable amount of solder is applied to the ends and body of the can, detracting from the appearance of the can and using up an excess of solder which is of no value to the sealing operation. In one instance involving the soldering of the end seams of an evaporated milk container, tests have shown that approximately 41% of the end of the can is coated with solder, while approximately 30% of the surface of the body of the can is also coated. Consequently, in this instance, 35% or more of the total outside surface of the can is coated with solder, which represents a serious waste inasmuch as the only solder necessary to the sealing operation is that required between the flange of the end and the body of the can.

Another objection to this method is that many cans are wasted because of the fact that occasionally the cans enter the bath with one end missing, and the solder gets on the interior of the can. There is no practicable way to remove this solder, so the can has to be scrapped.

It has been proposed heretofore to conserve solder by applying it with rolls revolving in the solder bath so as to confine within as narrow limits as possible the area to which the solder is applied. One such arrangement is shown, for example, in the patent to Jensen No. 551,122. Notwithstanding the teaching of this expired patent, the method first described above, entailing the rolling of the cans in tilted position through the molten solder bath, is still in use today. One difficulty with the roller type of machine has been that the roll does not fit into the seam between the body of the can and the end flange. This makes it difficult to get the solder into the seam, and solder is applied to a considerable area of the side of the can by reason of the necessarily large size of the solder roll which must be supported in the bath of molten solder and carry the weight of the cans passing above it.

It is an object of my invention to provide an improved soldering machine which eliminates these and other disadvantages of apparatus known or used heretofore.

More specifically, it is an object of my invention to provide a soldering machine which will produce an effective seal with a smaller amount of solder, thereby lowering operating costs as well as improving the appearance of the cans.

Other objects and advantages will appear as the description proceeds.

I have found that the application of solder can be confined closely to the meeting edges of the flange of the end or cover and the body of the can by employing a solder roll in the form of a long rod which is held under substantial tension as it revolves in a pot of molten solder with the upper side of the rod engaging the can at the proper point. The tensioning of the solder roll is a feature of particular importance because it makes possible the use of a roll or rod of extremely small diameter as opposed to the relatively large rolls which heretofore have been deemed necessary to withstand the distorting effect produced by the action of pressing the cams against the roll while it is immersed in the molten solder. The problem is one of providing a roll which is sufficiently strong to prevent distortion when arranged in contact with molten solder under conditions of transverse loading.

In accordance with my invention, the solder roll is made of a length which is at least equal to the circumference of the can, whereas its diameter is only a minor fraction of the diameter of the can. A solder roll of these proportions could not be employed with prior types of soldering apparatus without objectionable distortion of the roll in operation. However, I have found that by applying substantial tension to such a solder roll, distortion is prevented, or at least reduced to a point where it is negligible so far as practical operation is concerned. This is true even with a roll as small as ¼ or ⅜ inch in diameter, which are the sizes I prefer to employ.

I shall now describe a preferred embodiment of my improved apparatus with reference to the drawings in which:

Fig. 1 is a side elevational view of such preferred form of apparatus; and Fig. 2 is a detail cross-sectional view (to an enlarged scale) taken as indicated at 2—2 in Fig. 1.

Figs. 3, 4 and 5 are detail longitudinal cross-sectional views, Fig. 3 being taken as indicated at 3—3 in Fig. 2 and Figs. 4 and 5 illustrating the construction of the bearings at either end of the solder roll.

My improved apparatus comprises in its general arrangement a container for molten solder, a solder roll arranged to revolve in contact with the solder in the container, means for bringing the can ends into engagement with the solder roll for application of solder to the seam where the ends join the body of the can, together with means for applying substantial tension lengthwise of the solder roll. The solder roll itself is in the form of a long rod whose diameter is very small as compared with the size of the can so that solder is applied only at, or immediately adjacent, the seam. Alignment of the rod is preserved through the tensioning means which I shall describe in greater detail hereinbelow.

In the preferred embodiment illustrated, the elements of my apparatus are assembled on a base or frame 6 (Fig. 1). An elongated pot 7 or container for molten solder is carried on the frame in any convenient manner as by means of the supporting brackets 8. Bearing supports 9 which may, if desired, be formed integrally with end brackets 10, are mounted at the ends of the frame 6 to rotatably support the solder roll 11 which is in the form of a long rod extending from end to end of the machine, and which passes through the upper part of the pot 7 with its lower side in engagement with the molten solder.

The construction of the bearing supports 9 is shown in Figs. 4 and 5, the bearing housings being of generally cylindrical form and being carried on suitable supporting columns 12 formed on or secured to the bases 13 of the brackets 10. The cylindrical bore of each bearing housing may be provided with suitable bushings 14 providing bearing faces for the sleeve 15 which surrounds either end of the solder roll 11 and rotates therewith. The sleeves 15 may have a driving engagement with the solder roll. Means are provided for rotating the solder roll, such as the sprocket 16 which is formed on, or secured to, the sleeve 15 or roll 11, and which is driven by a chain 17 from a sprocket 18 keyed to a drive shaft 19 carried in bearings 20 associated with the frame 6. Preferably, there is a sprocket or equivalent driving means provided at each end of the roll 11, driven from the common drive shaft 19, at one end of which is a pulley 21 driven from any suitable power source (not shown).

Between the shoulder 22 of each sprocket 16 and the end of the corresponding radial bearing 9 is provided a thrust bearing such as the ball bearing 23. The rod 11, or a member attached thereto, extends through the sleeve 15 and sprocket 16 and, at one end of the machine shown in Fig. 4, is secured by a nut 24. At the other end of the machine, shown in Fig. 5, the rod 11 is provided with an extension 25 arranged to cooperate with a coil spring 26 for tensioning the rod 11. In my preferred construction, I employ telescoping sleeve members 27, 28 which surround the extension 25 of the solder roll and have opposed flanges 29, 29 forming seats for the ends of the spring 26. Extension 25 is threaded, and a nut 30 provides means for adjusting the compression of the spring and, accordingly, the degree of tension in the solder roll 11. I have found that with this tensioning arrangement, the roll 11, although being of comparatively small cross section, is prevented from becoming distorted notwithstanding the fact that it is arranged in contact with molten solder under conditions of transverse loading.

The means for bringing the can ends into engagement with the solder roll 11 for application of the solder are illustrated in Figs. 1 and 2, and consist, in general, of guide tracks running lengthwise of the machine and a conveyor belt arranged above the tracks for engagement with the top sides of the bodies of the cans. Suitable guide tracks are illustrated at 31, 32, supported (at the solder pot) by brackets 33 conveniently secured to the sides of the pot and brackets 34 forming extensions of the brackets 33, as shown best in Fig. 2. The guide tracks preferably are arranged to present the cans A to the solder roll 11 at a slight angle, and with the seam between the can ends or covers and bodies in engagement with the upper side of the roll, so that as the roll and cans revolve, solder from the pot is carried to the seams. For substantially the entire length of the pot 7, the guide tracks run in parallelism with the roll, so that the seams are in contact with the roll over a distance which is at least equal to the circumference of the cans, and preferably for a substantially greater distance. The cans are rolled along the track by means of a conveyor belt or chain such as the metal web belt 35 mounted on pulleys 36 carried in bearings in the end brackets 10 and driven from a suitable source of power (not shown). The belt 35 is pressed downwardly against the top sides of the can bodies by means of weighted rolls 37 freely mounted on supporting arms 38, the upper ends of which are journaled, as at 39, in a longitudinal supporting member 40 formed on, or secured to, brackets 41 which may conveniently be mounted at either end of the pot 7. Pins 42 secured to the longitudinal supporting member 40 provide limit stops for the supporting arms 38 of the weighted rolls. It will of course be understood that the details of construction of the guide tracks and conveying means are subject to considerable variation, and may be designed to suit the particular size and style of can which is to be soldered. The same is true of many of the other constructional details I have described.

After one end of the can has been soldered, the can may be turned end for end and fed through the machine a second time to solder the opposite end, although for continuous operation I prefer to provide two machines similar to the one described, the first machine being arranged to present one end of the can for soldering and the second machine to present the other end for like operation. The two machines may be reversed so that the cans will first have one end tilted down for soldering, and then the opposite end.

The solder pot is provided with a cover 43 having a charging opening 44 of limited extent. The cover may have a dependent flange 45 adjacent the roll 11, forming a relatively narrow passage 46 through which solder flows from the main part of the reservoir to the bottom of the solder roll. The cover and the side of the pot adjacent the roll may be curved to conform with the shape of the roll, as at 47. With this construction, only a very small portion of the surface of the molten solder is exposed to the atmosphere, reducing oxidation and insuring the feeding of clean solder to the roll. The roll engages bearings 48 at the ends of the pot to seal the reservoir at those points.

Suitable means for heating the solder pot are provided. Such means are well known in the art and need not be described here. If desired, a series of gas burners can be mounted above the guide tracks for directly heating the seams to sweat the solder into the joint. These and other modifications of the apparatus specifically described will be apparent to those skilled in the art. The terms and expressions which I have employed are used in a descriptive and not a limiting sense, and I have no intention of excluding such equivalents of the invention described, or of portions thereof, as fall within the purview of the claims.

I claim:

1. In a machine for soldering can ends and the like, a solder roll journalled in spaced bearings, means for applying molten solder to the solder roll, and means for tensioning the portion of the solder roll which lies between said bearings.

2. In a machine for soldering can ends and the like, a container for molten solder, a solder roll arranged to revolve in contact with the solder in said container, the length of the solder roll in contact with the molten solder being at least equal to the circumference of the can and the diameter of said solder roll being a minor fraction of the diameter of the can, and spring means arranged to apply tension to the length of the solder roll in contact with the molten solder during rotation thereof.

3. In a machine for soldering can ends and the like, a solder roll journalled in spaced bearings, said roll extending beyond at least one of said bearings, a spring surrounding the extended part of the roll, and means constructed and arranged for compressing the spring to place the roll under tension throughout its length between the bearings.

4. In a machine for soldering can ends and the like, a solder roll journalled in spaced bearings, said roll extending beyond at least one of said bearings, telescoping sleeve members surrounding the extended part of the roll and a spring arranged to be compressed between portions of said sleeve members to place the roll under tension and thereby prevent its distortion.

5. In a machine for soldering can ends and the like, a container for molten solder, a heat distortionable solder roll arranged to revolve in contact with the solder in said container, means for bringing the can ends into engagement with the solder roll for application of solder to the can ends, the solder roll being journalled in spaced bearings, and means for holding one end of the solder roll against longitudinal movement, the other end of the solder roll being slidably supported in its bearing and having means for urging the ends of the solder roll apart, thereby applying tension lengthwise of the solder roll to prevent its distortion.

6. In a machine for soldering can ends and the like, a container for molten solder, a solder roll arranged to revolve in contact with the solder, and means for rolling the cans along the solder roll with their ends pressed against the solder roll, said solder roll consisting of a rod tensioned against heat distortion throughout the length supporting the cans.

JOHN M. McCLATCHIE.